July 29, 1958 C. G. SMITH 2,845,371

PROCESS OF PRODUCING JUNCTIONS IN SEMICONDUCTORS

Filed Nov. 27, 1953

INVENTOR
CHARLES G. SMITH
BY Elmer J. Gorn
ATTORNEY

United States Patent Office 2,845,371

Patented July 29, 1958

2,845,371

PROCESS OF PRODUCING JUNCTIONS IN SEMICONDUCTORS

Charles G. Smith, Weston, Mass., assignor to Raytheon Manufacturing Company, Waltham, Mass., a corporation of Delaware Application November 27, 1953, Serial No. 394,684

6 Claims. (Cl. 148—1.5)

This invention relates to a method for making semiconductor junction-type single crystals and to the structure thereof and more particularly to the use of a cathode ray heating device to form longitudinal junctions of the n-p type.

In the production of transistors and semiconductor crystal diode devices, the problem of forming junctions within a single crystal of semiconductor material is one of considerable difficulty and normally necessitates the use of a complicated crystal growing apparatus and intricate doping techniques. Usually, one or two junctions transverse to the longitudinal axis of the crystal are obtained from these methods, and only a relatively small number of chips suitable for transistor or diode devices can be obtained therefrom. This invention involves a method of forming planar n-type and p-type layers parallel to the longitudinal axis of a single crystal bar of semiconductor material by employing cathode rays to melt selected regions of the crystal, and by utilizing the differences in the rates of evaporation of the n-type and p-type doping elements within the crystal to create these junctions. From the longitudinal junctions formed, a large number of chips suitable for semi-conductor devices can be made by cutting the bar into transverse slices by means well known in the art.

For example, one innovation of this invention utilizes a cathode ray heating device wherein a beam of electrons is concentrated in a localized region of a bar of semiconductor material, such as a bar of germanium, which has been previously doped with elements whose rates of evaporation and whose concentrations in the germanium bar are substantially different. These doping elements could be arsenic, an n-type doping element, and gallium, a p-type doping element, and should be evenly dispersed throughout the bar in any of a number of ways well known in the art. For example, two molecular parts arsenic to one part gallium to $10^7$ parts of germanium can be used successfully to form a single crystal bar of germanium by the conventional seed-pulling method. It is known that arsenic, which has a high rate of evaporation and is quite volatile when heated, will readily evaporate in a vacuum from a molten area of germanium whereas gallium, which has a substantially lower rate of evaporation, will not. Thus, by utilizing a beam of electrons from the cathode ray device, a substantially rectangular bar of germanium can be melted along a predetermined region thereof to a predetermined depth to form longitudinal n-type and p-type layers therein. As the melting process progresses, the arsenic, which is sufficiently concentrated in the semiconductor material before the heating process to make the entire bar n-type will escape from the molten section of the bar. Since the concentration of p-type gallium now exceeds that of the n-type arsenic within this molten area, a p-type section of semiconductor material will be created. Thus, by slowly moving the bar along a horizontal plane and by properly scanning and successively melting adjacent upper regions of the bar, an upper layer of the bar can be changed to p-type germanium. Since the unmelted section of the bar remains unchanged, it is still n-type germanium and the interface between the melted and unmelted section is a p-n type junction. This junction will be planar in form, parallel to the longitudinal axis of the bar, and represents the lower limit of the melting process.

From the aforementioned process, it may be seen that the same bar of germanium can be turned over so that the face of the bar opposite to that which was previously treated can also be melted. Thus, a second p-type layer can be created along this opposite face, and the bar will now contain two opposed p-type layers separated by an intermediate n-type layer or, as it is known in the art, a p-n-p type junction.

This invention and the features thereof will be understood more clearly and fully from the following detailed description of one embodiment of the invention with reference to the accompanying drawings wherein.

Figure 4:
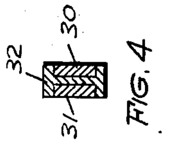
Figure 3:
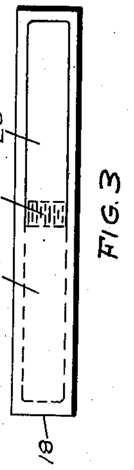

Fig. 3 is a top view of a bar of semiconductor material wherein the dotted area depicts a section of the bar which has yet to be acted upon by the cathode ray heating device, the intermediate area shows a molten section of the bar, and the right-hand area illustrates a section of the bar which has previously been melted and has re-solidified; and Fig. 4 is a cross-sectional view of the bar shown in Fig. 3 after the melting process is completed and the junctions have been formed.

Figure 2:
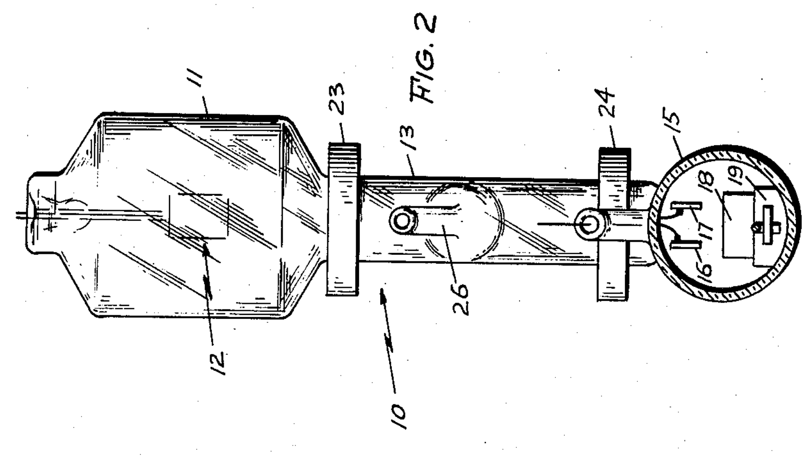
Fig. 2 is a view taken along line 2—2 of Fig. 1.
Figure 1:
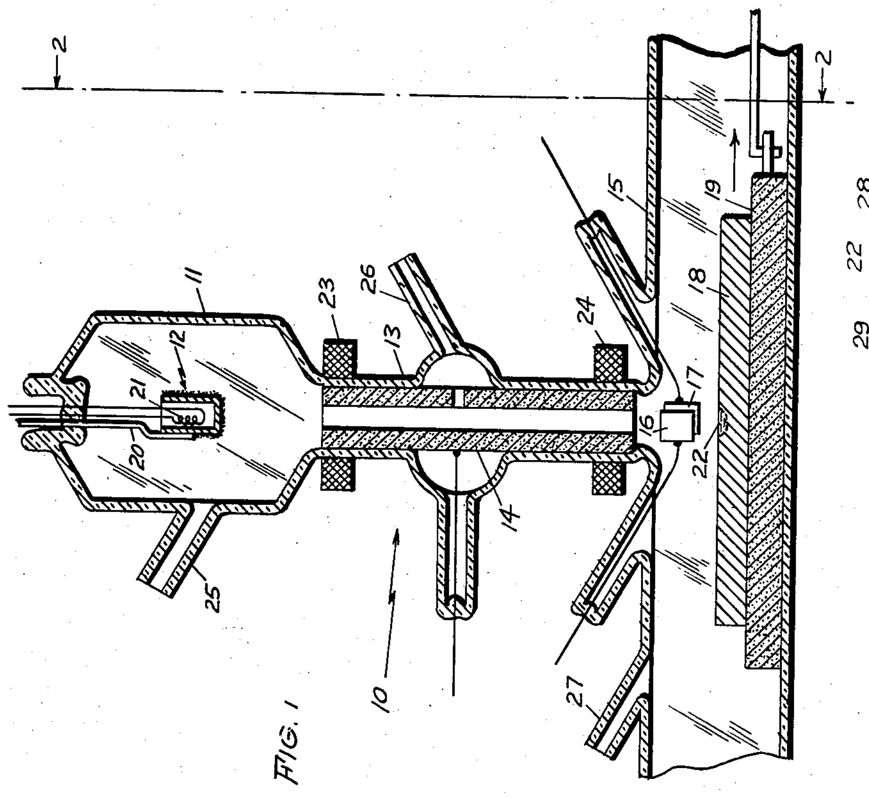
Fig. 1 is a cross-sectional view of a cathode ray heating device made in accordance with this invention.

Referring now to Figs. 1 and 2, a cathode ray heating device 10 made in accordance with this invention is shown and comprises three adjoining chambers 11, 13 and 15, each of which can be made of Pyrex, for example. The upper chamber 11 is utilized to house a source of a beam of electrons, such as the filamentary cathode 12 shown therein. The middle chamber 13 is adapted to hold a beam focusing electrode 14 which can be a cylindrically shaped sleeve of graphite, as illustrated in Fig. 1. The lower chamber 15 is a tubular shaped Pyrex chamber wherein a pair of deflector plates 16 and 17 are mounted and in which a substantially rectangular bar 18 of semiconductor material and a movable platform 19 are disposed. Although both ends of the chamber 15 are broken off, as shown in Fig. 1, these ends are sealed to permit evacuation of the chamber. The platform 19 can also be made of graphite, and can be advanced along a horizontal plane by any of a number of suitable means, not shown.

The cathode 12, shown in Fig. 1, is a cylindrical sleeve, which is enclosed on the bottom side thereof, and coated with a suitable electron-emissive material. The cathode is supported by a rod 20 and is heated by a coil 21 which is connected to an external source of electrical power, not shown. The electrode 14 is utilized to direct the beam of electrons through the deflector plates 16 and 17 to melt a predetermined area on the bar 18. This melted area is shown as a semi-cylindrical section 22 in Fig. 1. During the operation of the heating device 10, the electrode 14 is biased at approximately 15,000 volts and is positive with respect to the cathode 12. Also, two magnets 23 and 24 are positioned at opposite ends of the chamber 13 and are employed as focusing coils to direct the electrons onto the bar 18. It should be noted that the three chambers 11, 13 and 15 are evacuated prior to heating the bar 18 so that a high voltage can be used during the process and to aid in the evaporation process. Suitable air pumps, not shown, are used for this purpose and are connected to the exhaust tubes 25, 26 and 27. These pumps are operated throughout the heating process so the air pressure within the chambers 13 and 15 is kept at about .001 millimeter during the junction forming operation, although pressure within the chamber 11 is usually much lower.

By referring now to Figs. 1, 2 and 3, the junction forming process can be understood. The deflector plates 16 and 17 are suitably biased through the leads connected thereto to cause the beam of electrons to scan and melt an upper section of the bar 18 as the bar is slowly moved under the beam. It should be noted that the molten area 22, shown in Figs. 1 and 3, is being heated during an intermediate step of the process and, by referring to the top view of the bar shown in Fig. 3, it can be seen that prior to this step a forward or right-hand section 28 of the bar 18 has already been melted and has re-solidified. As shown in Fig. 3, the molten area 22 and the previously melted area 28 are created by scanning the beam of electrons along a line transverse to the longitudinal axis of the bar 18 and intermediate the sides thereof. The depth and width of these melted areas are controlled by the rate at which the platform 19 is moved, the spacing of the deflector plates 16 and 17, and the intensity of the beam. To avoid putting too much energy into one area of the bar and to facilitate the melting process, the entire bar could be heated to about ten degrees C. below its melting point by an external heating device, not shown. Such a heating device could be a resistance coil positioned adjacent to the outer surface of the lower chamber 15.

Thus, the bar 18 of semiconductor material, which can be cut from a single crystal of germanium that has previously been drawn and evenly doped with two parts arsenic to one part gallium, can be heated and successive regions can be melted along a predetermined area thereof to a predetermined depth. When this melting process occurs, a majority of the arsenic atoms within the small molten area 22 are evaporated therefrom, and, when this area cools, as has the region 28 shown in Fig. 3, a p-type layer parallel to the longitudinal axis of the bar is formed. This layer is p-type in its electrical characteristics because concentration of gallium therein exceeds that of the arsenic. Beneath this p-type layer the arsenic atoms have not been affected by the heating process and that region of the bar retains its n-type characteristics due to the greater concentration of arsenic therein, Thus, if the bar is slowly moved along a horizontal path, as shown by the arrow in Fig. 1, and successive areas of the bar are melted, the result is a layer of p-type material along an upper section of the bar positioned adjacent to an underlying layer of n-type material. The junction between the p-type and n-type layers is a planar interface represented by the lower limit of the melting process. The dotted area 29, shown in Fig. 3, represents the area of the bar 18, which has yet to be melted to complete the p-type layer being formed.

After the melting process has been completed on one side of the bar and the bar has re-solidified, the bar can be turned on its opposite side and a second p-type layer can be formed on this face of the bar, as described above, to complete the process. Thus, two opposed p-type layers of germanium separated by a substantially unaffected intermediate layer of n-type material have been formed. This intermediate layer has not been melted nor has it been heated sufficiently to evaporate the arsenic therein. Therefore, the intermediate layer, as mentioned above, will remain n-type germanium. By referring to Fig. 4, a cross-sectional view of the two opposed p-type layers 30 and 31 may be seen with the intermediate layer 32 of n-type material disposed therebetween. The large end sections of the n-type layer 32 are suitable for making connections thereto, and are achieved as a result of foreshortening the distance scanned by the electron beam so the outer edges of the bar are not melted during the heating process. The bar 18 can now be sliced and cut into chips, by methods well-known in the art, to form a plurality of p-n-p type germanium chips suitable for transistor devices.

However, it should be understood that this invention is not limited to the particular details described above, as many equivalents will suggest themselves to those skilled in the art. A number of alternative procedures can be utilized to form p-n type junctions. For example, a layer of finely divided germanium, properly doped with gallium, can be sprinkled on an upper face of an n-type arsenic doped germanium bar, and this sprinkled layer of germanium can be heated with the cathode ray device. As the melting process occurs, the gallium doped germanium particles will melt, mix with the molten section of the bar, and the arsenic therein will be evaporated from this molten area to again create a p-type region and a p-n type junction.

Furthermore, it should be noted that many different geometric forms of p-n type junctions can be made by employing the cathode ray heating method described above and n-p-n type junctions can be formed as well as the p-n-p type described above. The beam of cathode rays could be concentrated on a small circular area of the bar and the melting process could be continued until a cylindrical p-type section had been created therein. The areas adjacent to this p-type section would retain their n-type characteristics and, as the cylindrical section re-solidified, a junction diode would be formed. Similarly, a plurality of such cylindrical molten sections could be successively formed on the same bar to create a number of such diodes. Also the plates 16 and 17 could be increased in size to melt the entire area and without having to move the bar 18.

Likewise, it should be noted that silicon can be used as well as germanium as the semiconductor material employed for the purposes of this invention. Also, a number of combinations of doping elements can be utilized as long as the rate of evaporation of one of the elements is substantially greater than the rate of evaporation of the other element being used. For example, boron may be substituted for gallium in the process previously described, and, when using silicon as the semiconductor material, phosphorous can be substituted for arsenic as the n-type doping element. Likewise, the concentrations of these doping elements can be varied as desired. Therefore, it is desired that the appended claims be given a broad interpretation commensurate with the scope of the invention within the art.

What is claimed is:

1. The method of making a junction in a body of semiconductor material, said method comprising providing a single crystal of semiconductor material selected from the group consisting of germanium and silicon, doping said crystal with an initial concentration of a first and a second electrical conductivity-type determining impurity element, one of said impurity elements having a substantially higher rate of evaporation from said crystal than the other of said impurity elements for the same condition of temperature, and heating a predetermined area of said crystal of said semiconductor material to cause said doping element having the higher rate of evaporation to evaporate from said crystal thereby providing a predominance of the other of said impurity elements in said predetermined area.

2. The method of making a junction in a body of semiconductor material, said method comprising providing a single crystal of semiconductive material selected from the group consisting of germanium and silicon, said crystal having a first doping element therein which has a substantially high rate of evaporation from said crystal, covering a predetermined area of said semiconductor material with a layer of additional semiconductor material htaving a second doping element therein, said second doping element having a substantially lower rate of evaporation than said first doping element, heating said area to a temperature above the melting point of said semiconductor material to cause said first doping element to evaporate from said area and cause said second doping element to be predominantly concentrated in said area, and cooling said crystal to resolidify said melted area.

3. The method of making a junction in a body of semiconductor material, said method comprising providing a single crystal of semiconductor material selected from the group consisting of germanium and silicon, providing said semiconductor material with a predetermined concentration of a P-type doping element and an N-type doping element, said elements each having a substantially different rate of evaporation from said semiconductor material, the initial concentration of said element having the higher rate of evaporation being substantially greater than the other of said elements, heating a predetermined area of said semiconductor material to a temperature above the melting point of said material to evaporate said element having the higher rate of evaporation thereby causing the concentration of said element having the higher rate of evaporation to fall below the concentration of the other of said elements in said area, and cooling said crystal to resolidify said melted area.

4. The method of making a junction in a body of semiconductor material, said method comprising providing a single crystal of semiconductor material selected from the group consisting of germanium and silicon, providing said crystal with a predetermined concentration of a P-type doping element and an N-type doping element, said elements each having a substantially different rate of evaporation from said semiconductor material, the initial concentration of said element having the higher rate of evaporation being substantially greater than the other of said elements, moving said material under a beam of electrons to melt successive portions of a predetermined area of said material thereby causing the concentration of said evaporated element to fall below the concentration of the other of said elements in each of said successive sections, and cooling said crystal to resolidify said melted area.

5. The method of making a junction in a body of semiconductor material, said method comprising providing a single crystal of semiconductor material selected from the group consisting of germanium and silicon, providing said crystal with a predetermined concentration of a P-type doping element and an N-type doping element, said elements each having a substantially different rate of evaporation from said semiconductor material, the initial concentration of said element having the higher rate of evaporation being substantially greater than the other of said elements, said semiconductor material being positioned within an evacuated chamber, heating a predetermined longitudinal area of said semiconductor material with a beam of electrons to cause said element having the higher rate of evaporation to be evaporated from said semiconductor material thereby causing the concentration of said evaporated element to fall below the concentration of the other of said elements in said longitudinal area.

6. The method of making a junction in a single crystal semiconductor material, said method comprising doping a body of semiconductor material selected from the group consisting of germanium and silicon with an initial concentration of a first and a second electrical conductivity-type determining impurity element, one of said impurity elements having a substantially higher rate of evaporation from said body than the other of said impurity elements for the same condition of temperature, and heating a predetermined region of said body to a temperature sufficient to cause said doping element having the higher rate of evaporation to diffuse within and evaporate from said body, thereby providing a predominance of the other of said impurity elements in said predetermined region.

References Cited in the file of this patent

UNITED STATES PATENTS

| | | |
|---|---|---|
| 2,560,792 | Gibney | July 17, 1951 |
| 2,567,970 | Scaff et al. | Sept. 18, 1951 |
| 2,651,831 | Bond et al. | Sept. 15, 1953 |
| 2,730,470 | Shockley | Jan. 10, 1956 |
| 2,739,088 | Pfann | Mar. 20, 1956 |

FOREIGN PATENTS

| | | |
|---|---|---|
| 1,065,523 | France | Jan. 13, 1954 |